United States Patent
Paramasivan

(10) Patent No.: US 11,000,940 B2
(45) Date of Patent: May 11, 2021

(54) AUTOMATED FASTENER ASSEMBLY

(71) Applicant: Arvind Kumar Tirchirapolly Paramasivan, Bangalore (IN)

(72) Inventor: Arvind Kumar Tirchirapolly Paramasivan, Bangalore (IN)

(*) Notice: Subject to any disclaimer, the term of this patent is extended or adjusted under 35 U.S.C. 154(b) by 129 days.

(21) Appl. No.: 15/517,535

(22) PCT Filed: Sep. 23, 2015

(86) PCT No.: PCT/IB2015/057330
§ 371 (c)(1),
(2) Date: Apr. 7, 2017

(87) PCT Pub. No.: WO2016/055891
PCT Pub. Date: Apr. 14, 2016

(65) Prior Publication Data
US 2017/0297184 A1   Oct. 19, 2017

(30) Foreign Application Priority Data
Oct. 7, 2014   (IN) .......................... 5028/CHE/2014

(51) Int. Cl.
*B23P 19/06*   (2006.01)
*B25B 23/00*   (2006.01)
(Continued)

(52) U.S. Cl.
CPC .............. *B25B 23/12* (2013.01); *B23P 19/06* (2013.01); *B25B 21/00* (2013.01); *B25B 23/0064* (2013.01)

(58) Field of Classification Search
CPC ........ B23P 19/06; B23P 19/066; B23B 21/00; B23B 23/0064; B23B 23/12; B25J 9/1633; G05B 2219/39527
(Continued)

(56) References Cited

U.S. PATENT DOCUMENTS 1,343,667 A * 6/1920 Evensen ............... B25B 21/001
                                                      81/56
2,789,597 A * 4/1957 La Torre ............. B25B 27/0014
                                                      81/55
(Continued)

FOREIGN PATENT DOCUMENTS

DE   102010040150 A1 * 3/2012  ............. B25B 21/00

OTHER PUBLICATIONS

International Search Report and Written Opinion for PCT/IB2015/057330, dated Apr. 29, 2016.
(Continued)

*Primary Examiner* — Joseph J Hail
*Assistant Examiner* — Arman Milanian
(74) *Attorney, Agent, or Firm* — Hauptman Ham, LLP

(57) ABSTRACT

A fastener assembly (100) comprising: a housing member (1); a drive mechanism (2) accommodated within the housing member (1), wherein the drive mechanism (2) comprises of: a hollow drive shaft (3) fixed to the drive mechanism (2), wherein torque from the drive mechanism (2) is transferred to the hollow drive shaft (3); a resilient member (4) housed within the hollow drive shaft (3) accommodates a detachable torque driver (5), wherein the torque driver (5) is provided within the hollow drive shaft (3) and is capable to receive torque from the hollow drive shaft (3).

9 Claims, 4 Drawing Sheets

(51) Int. Cl.
*B25B 23/12* (2006.01)
*B25B 21/00* (2006.01)

(58) Field of Classification Search
USPC .................................. 81/479, 52, 57, 448
See application file for complete search history.

(56) References Cited

U.S. PATENT DOCUMENTS

| | | | | |
|---|---|---|---|---|
| 3,324,747 A * | 6/1967 | Able | ............... | B25B 21/002 81/57 |
| 3,368,602 A | 2/1968 | Boyd | | |
| 3,369,615 A * | 2/1968 | Maffey, Jr. | ............ | B25B 21/026 173/93.6 |
| 3,539,087 A | 11/1970 | Burch | | |
| 3,850,055 A * | 11/1974 | Triplett | ............... | B25B 27/0014 81/476 |
| 3,910,325 A | 10/1975 | Dixon | | |
| 4,106,371 A * | 8/1978 | Akiyoshi | ............. | B25B 21/002 81/124.1 |
| 4,550,633 A * | 11/1985 | Fujita | ............... | B25B 21/001 81/56 |
| 4,836,062 A * | 6/1989 | LaTorre | ............ | B25B 27/0007 81/13 |
| 4,924,732 A * | 5/1990 | Hoskins | ............... | B25B 21/00 81/451 |
| 4,982,632 A * | 1/1991 | Barmore | ............... | B25B 13/06 279/83 |
| 5,592,861 A * | 1/1997 | Barmore | ............... | B25B 13/06 81/124.6 |
| 6,247,387 B1 * | 6/2001 | Ketteringham | ........ | B23P 19/066 81/467 |
| 7,178,432 B1 * | 2/2007 | Han | ........................ | B25B 23/04 227/112 |
| 8,230,570 B1 * | 7/2012 | Choong | ................. | B23P 19/001 29/407.02 |
| 2005/0193869 A1 * | 9/2005 | Ohtake | .................. | B25B 23/14 81/57.38 |
| 2006/0002783 A1 | 1/2006 | Rudduck et al. | | |
| 2008/0000333 A1 * | 1/2008 | Seno | ...................... | B23P 19/06 81/467 |
| 2009/0107274 A1 | 4/2009 | Fukushima et al. | | |
| 2011/0185864 A1 * | 8/2011 | Ide | ........................ | B25B 23/147 81/479 |
| 2011/0315414 A1 * | 12/2011 | Kuntner | ................ | B25B 23/14 173/1 |
| 2012/0093609 A1 | 4/2012 | Trifilio et al. | | |
| 2013/0067711 A1 * | 3/2013 | Harada | ................. | B23P 19/06 29/407.01 |
| 2013/0263433 A1 * | 10/2013 | Stoian | .................... | B21J 15/02 29/525.06 |

OTHER PUBLICATIONS

International Preliminary Report on Patentability for PCT/IB2015/057330, dated Mar. 23, 2017.

* cited by examiner

AUTOMATED FASTENER ASSEMBLY

TECHNICAL FIELD

Embodiments of the present disclosure relates to a fastener assembly. In particular relates to a fastener assembly for automatic fastening and unfastening of fasteners.

BACKGROUND OF THE DISCLOSURE

In many instances, users/persons find it difficult to unscrew or unbolt fasteners such as screws, nuts, bolts etc., from a fastened member. In many other occasions, the user might not even have the right tools to apply enough grip and torque to the fastener for fastening and fastening the components. This makes the user disowned and the user can take no other action apart from sabotaging the fastened component. Sabotaging the component with the fastener would render the component useless. Moreover, sabotaging the component might increase the risk of injuries caused to the user. Further, there might arise some instances where the fasteners have to be automatically unscrewed/unbolted without manual interference which can save time and energy used.

Conventionally, fasteners are used in almost all the applications such as printed circuit boards (PCB), door hinges, vehicles etc., and conventionally fastening of these fasteners utilize manual labour by use of screw drivers, wrenches etc. Modern techniques involve usage of power tools such as electronic screw drills, self-adjusting wrenches etc., to help apply minimum force or effort from the user. However, the screw drivers, wrenches and electronic drill cannot be used in locations where the fasteners can't be reached by the user. This leads to removal of various other components in order to get to the actual component to be removed for e.g. Engine bays, seats, seat anchorages etc.

Also, due to environmental factors the fasteners might get corroded and hence lose their heads having the patterns for screwing or unscrewing the fastener. This might lead to wastage of time and manual labour in order to remove the said component.

Hence, there is a need to develop an automatic fastening and unfastening fastener assembly which by push of a button or programmed inputs can fasten or unfasten the fastener and overcome the limitations stated above.

SUMMARY OF THE DISCLOSURE

One or more shortcomings of the prior art are overcome and additional advantages are provided through the present disclosure. Additional features and advantages are realized through the techniques of the present disclosure. Other embodiments and aspects of the disclosure are described in detail herein and are considered a part of the claimed disclosure.

Accordingly, in one non-limiting embodiment of the present disclosure there is provided a fastener assembly comprising: a housing member; a drive mechanism accommodated within the housing member, wherein the drive mechanism comprises of: a hollow drive shaft fixed to the drive mechanism, wherein torque from the drive mechanism is transferred to the hollow drive shaft; a resilient member housed within the hollow drive shaft accommodates a detachable torque driver, wherein the torque driver is provided within the hollow drive shaft and is capable to receive torque from the hollow drive shaft.

In an embodiment of the present disclosure, the housing member is compartmentalized into a bottom hollow cavity and a top threaded cavity, the bottom hollow cavity adapted for housing the drive mechanism and a top threaded cavity adapted for accommodating a fastener.

In an embodiment of the present disclosure, a washer nut, the washer nut is secured on to mouth of the hollow drive shaft.

In an embodiment of the present disclosure, shape of central hole of the washer nut conforms to the shape of the torque driver.

In an embodiment of the present disclosure, the resilient member is a compression spring.

In an embodiment of the present disclosure, the resilient member actuates the torque driver linearly within the hollow drive shaft.

In an embodiment of the present disclosure, a stopper plate is provided at tip end of the torque driver to avert non-linear movement of the torque driver within the hollow drive shaft.

In an embodiment of the present disclosure, the drive mechanism is connectable to a power source for operation of the drive mechanism.

In an embodiment of the present disclosure, one or more sensors are interfaced to a control unit for providing feedback in order to control the fastening and unfastening of the fastener.

In an embodiment of the present disclosure discloses a method of operating a fastener assembly comprising steps of: operating a drive mechanism fixed with a hollow drive shaft, wherein the hollow drive shaft accommodates a torque driver for coupling to a fastener. Transferring torque to the hollow drive shaft by the drive mechanism, wherein the hollow drive shaft applies torque on to the torque driver for fastening and unfastening the fastener.

In an embodiment of the present disclosure clockwise rotation of the torque driver fastens the fastener.

In an embodiment of the present disclosure anti-clockwise rotation of the torque driver unfastens the fastener.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE ACCOMPANYING DRAWINGS

The features of the present disclosure are set forth with particularity in the following description. The disclosure itself, together with further features and attended advantages, will become apparent from consideration of the following detailed description, taken in conjunction with the accompanying drawings. One or more embodiments of the present disclosure are now described, by way of example only, with reference to the accompanied drawings wherein like reference numerals represent like elements and in which.

The figures depict embodiments of the disclosure for purposes of illustration only. One skilled in the art will readily recognize from the following description that alternative embodiments of the structures and methods illustrated herein may be employed without departing from the principles of the disclosure described herein.

DETAILED DESCRIPTION

The foregoing has broadly outlined the features and technical advantages of the present disclosure in order that the detailed description of the disclosure that follows may be better understood. Additional features and advantages of the disclosure will be described hereinafter which form the subject of the claims of the disclosure. It should be appreciated by those skilled in the art that the conception and specific embodiment disclosed may be readily utilized as a basis for modifying or designing other structures for carrying out the same purposes of the present disclosure. It should also be realized by those skilled in the art that such equivalent constructions do not depart from the spirit and scope of the disclosure as set forth in the appended claims. The novel features which are believed to be characteristic of the disclosure, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present disclosure. It will be readily understood that the aspects of the present disclosure, as generally described herein, and illustrated in the figures, can be arranged, substituted, combined, and designed in a wide variety of different configurations, all of which are explicitly contemplated and make part of this disclosure.

The terms "comprises", "comprising", or any other variations thereof, are intended to cover a non-exclusive inclusion, such that a system, device or method that comprises a list of components or steps does not include only those components or steps but may include other components or steps not expressly listed or inherent to such setup or device or method. In other words, one or more elements in a system or apparatus proceeded by "comprises . . . a" does not, without more constraints, preclude the existence of other elements or additional elements in the system or apparatus.

Figure 1:
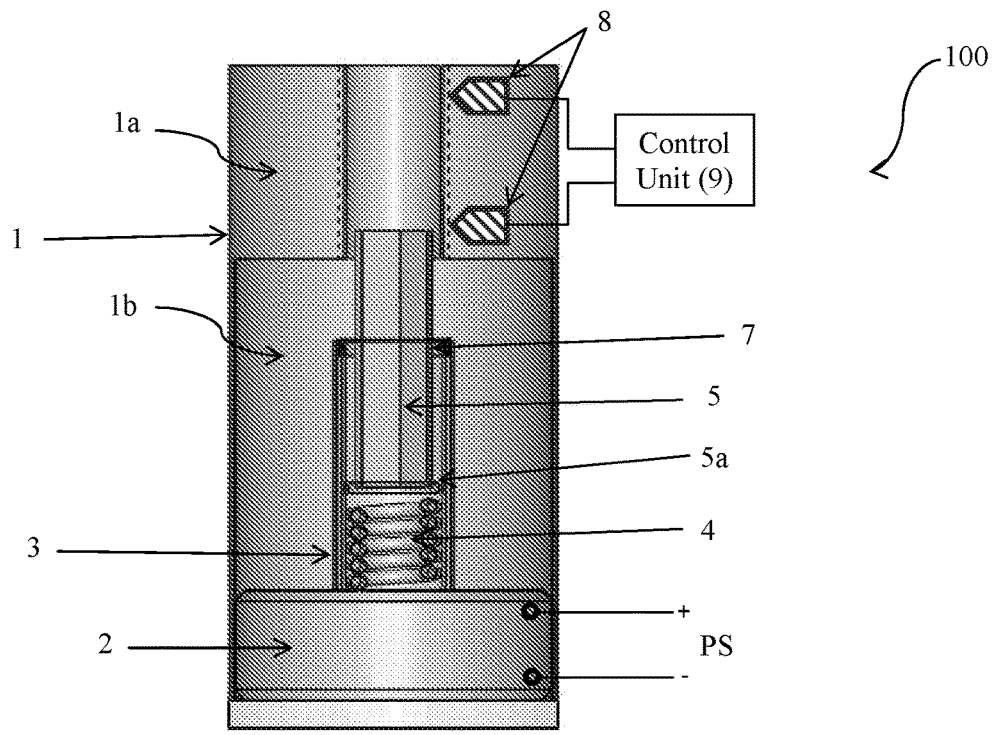
FIG. 1 illustrates front cut sectional view of the fastener assembly and transparent view of hollow drive shaft in accordance with an embodiment of the present disclosure.
Figure 2:
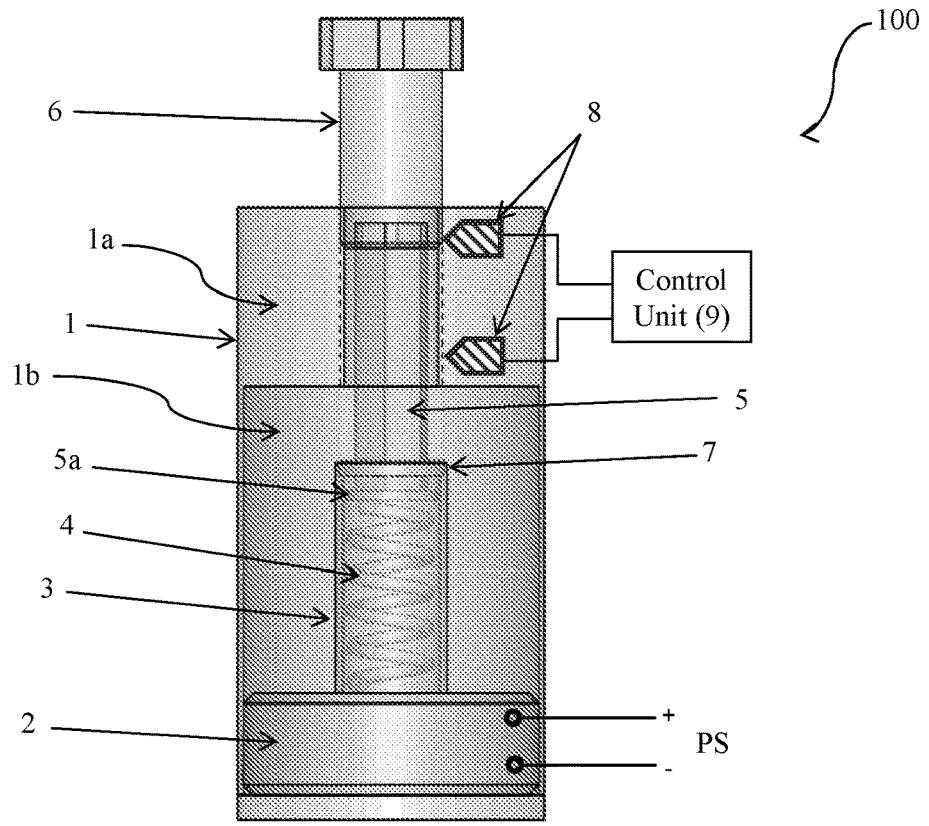
FIG. 2 illustrates front cut sectional view of the fastener assembly with a fastener in accordance with an embodiment of the present disclosure.

FIG. 1 illustrates front cut sectional view of the fastener assembly (100) and transparent view of hollow drive shaft (3) in accordance with an embodiment of the present disclosure. The fastener assembly (100) consists of a housing member (1) which is compartmentalized into a top deck (1a) having a central threaded through hole (10) for accommodating a fastener (6) also referred to as fastener member (6) as shown in FIG. 2. In an embodiment of the present disclosure, the through hole (10) can be a non-threaded hole or partially threaded hole or any other type of hole which serves the purpose of locking the fastener (6) within the housing member (1). A bottom hollow deck (1 b) is configured to be a hollow cavity, wherein the bottom hollow deck (1 b) houses the drive mechanism (2) and the torque driver (5). The housing member (1) has a closing means (11) provided at the bottom hollow deck (1 b) end which is used to cover the fastener assembly (100). The closing means (11) is at least one of a threaded cap, a snap fitting cap and zip lock cap.

In an embodiment of the present disclosure, closing means (11) provides ingress protection to the drive mechanism (2) and other mechanical components housed within the housing member (1). This helps the workability of the fastener assembly (100) in abusive and harsh environments.

The drive mechanism (2) is at least one of a Direct Current (DC) motor or an Alternating Current (AC) motor. The drive mechanism (2) is mounted within the bottom hollow deck (1b) equipped with a hollow drive shaft (3) which is detachably fixed. The hollow drive shaft (3) is mounted directly on the rotating shaft of the drive mechanism (2). When the drive mechanism (2) is energized, the rotating shaft (not shown in figure) transfers torque to the hollow drive shaft (3).

The hollow drive shaft (3) incorporates a resilient member (4) within its hollow hull which aids in providing linear actuation to the torque driver (5) mounted over the resilient member (4). The torque driver (5) is mounted over the resilient member (4) wherein, the torque driver (5) has a stopper plate (5a) provided at one end of the torque driver (5) which abuts the resilient member (4). The hollow drive shaft (3) is detachably fixed to the rotary shaft of the drive mechanism (2) and is susceptible to varying movement's i.e. clockwise rotation and anticlockwise rotation.

The mouth of the hollow drive shaft (3) is provided with a washer nut (7) having a central hole (7a) which has the same shape as that of the torque driver (5). The washer nut (7) acts as an axle member which transfers the torque onto the torque driver (5).

In an embodiment of the present disclosure, the washer nut (7) and the shape of the central hole (7a) vary according to the utilization of torque driver (5).

During operation, a fastener member (6) is placed at the mouth of the threaded hole ( ) provided at the top deck (1a). The fastener member (6) is adapted to have similar impression as that of the torque driver (5). As an example, if the torque driver (5) is an Allen key having a hexagonal shape, then the root part of the fastener (6) would have the same hexagonal indentation. The fastener (6) having a particular indentation fits onto the torque driver (5). The resilient member (4) is at a fully extended position and in turn linearly actuates the torque driver (5) up to the mouth of the threaded hole. The drive mechanism (2) is activated by a power source (PS) which in a particular embodiment rotates the hollow drive shaft (3) in one direction, for example anti-clockwise direction which fastens the fastener (6) into the housing member (1). Once the fastener (6) has been completely threaded into the housing member (1), the resilient member (4) is at a fully compressed state.

In an embodiment of the present disclosure, the drive mechanism (2) can be controlled by reversing the polarity of the power source (PS). By doing so, the hollow drive shaft (3) rotates in other direction, for example clockwise direction. The torque from the hollow drive shaft (3) is transmitted to the torque driver (5) which unfastens the fastener (6) from the threaded hole. The torque driver (5) receives continuous torque from the hollow drive shaft (3) either in clockwise or anti clockwise depending on the requirement and the polarity of the power source (PS). The hollow drive shaft (3) delivers this torque on to the torque driver (5) by a washer nut (7) having a through hole (10) in the shape of the torque driver (5). The washer nut (7) is fitted at the mouth of the hollow drive shaft (3) which is in close tolerance fit with the torque driver (5). The washer nut (7) has an exact fit on the torque driver (5) and hence the torque from the drive mechanism (2) is transmitted to the torque driver (5).

In an embodiment of the present disclosure, the power source (PS) polarity is maintained at positive polarity to provide clockwise rotation to the drive mechanism (2).

In an embodiment of the present disclosure, the power source (PS) polarity is maintained at negative polarity to provide anti-clockwise rotation to the drive mechanism (2).

In an embodiment of the present disclosure, the tip end of the torque driver (5) is magnetized so as to hold the fastener (6) from tipping over of the housing member (1).

In an embodiment of the present disclosure, the stopper plate (5a) provided at the bottom tip end of the torque driver (5) prevent excess movement of the torque driver (5) within the hollow drive shaft (3).

In an embodiment of the present disclosure, the stopper plate (5a) provided at the bottom tip end of the torque driver (5) aids in distributing the compression and expansion forces proportionately in order to actuate linearly.

In an embodiment of the present disclosure, the resilient member (4) is in a compressed state when the fastener (6) is in a fastened position.

In an embodiment of the present disclosure, the resilient member (4) is in an extended state when the fastener (6) is in an unfastened position.

FIG. 2 illustrates front cut sectional view of the fastener assembly (100) with a fastener (6) in accordance with an embodiment of the present disclosure. The fastener (6) is in an unfastened state wherein, the resilient member (4) provided within the hollow drive shaft (3) is in a fully extended condition. The torque driver (5) in an exemplary embodiment of the present disclosure is an Allen key which is mated to the root of the fastener (6). The fastener (6) in an exemplary embodiment of the present disclosure is a hexagonal bolt. The root of the hexagonal bolt has an Allen key indentation so that the torque driver (5) couples with the fastener (6) for fastening and unfastening.

In an embodiment of the present disclosure, the bottom end of the fastener (6) is provided with at least one of a Torx™ indentation, a slotted indentation, hexagonal indentation and any other indentation which serves the purpose.

In an embodiment of the present disclosure, at least one sensor (8) is installed at the top deck (1a), so as to sense the insertion of the fastener (6). The sensor (8) is mated to a control unit (9) to control the fastening and unfastening of the fastener assembly (100) without manual operation from the user.

In an embodiment of the present disclosure, at least one sensor (8) senses and sends feedback to the control unit (9) if the fastener (6) is completely fastened or unfastened as a safety provision.

In an embodiment of the present disclosure, the sensors (8) can be programmed so as to give appropriate feedback to a user on the amount of torque supplied by the drive mechanism (2) to the torque driver (5) for fastening and unfastening the fastener (6).

In an embodiment of the present disclosure, the control unit (9) can be programmed so as to operate the sensors (8) only by authorized personnel. This is can avoid any potential sabotage or mishandling of the fastener assembly (100).

In an embodiment of the present disclosure, the sensors (8) are at least one of proximity sensor, contact sensors, rotary sensors, torque sensor, current sensor or any other sensors which serves the purpose.

Figure 3:
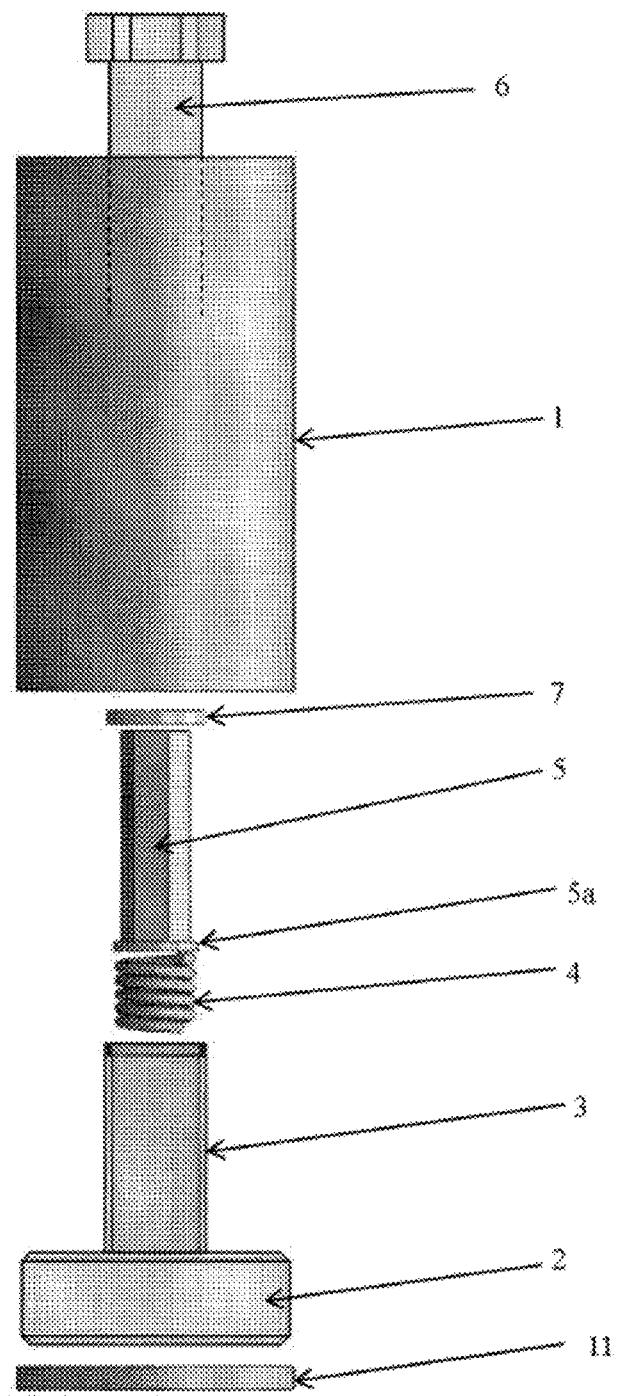
FIG. 3 illustrates exploded view of the fastener assembly and transparent view of hollow drive shaft in accordance with an embodiment of the present disclosure.

FIG. 3 illustrates exploded view of the fastener assembly (100) in accordance with an embodiment of the present disclosure. The fastener assembly (100) may be completely detached and reassembled based on the requirement of the user. The bottom hollow deck (1 b) of the fastener assembly (100) consists of a drive mechanism (2) mounted with a hollow drive shaft (3). The hollow drive shaft (3) accommodates a resilient member (4) over which a torque driver (5) is mounted and finally a washer nut (7) is fixed at the mouth of the hollow drive shaft (3). A closing means (11) is provided at the bottom end of the housing assembly (1) so as to provide support and ingress protection.

Figure 4:
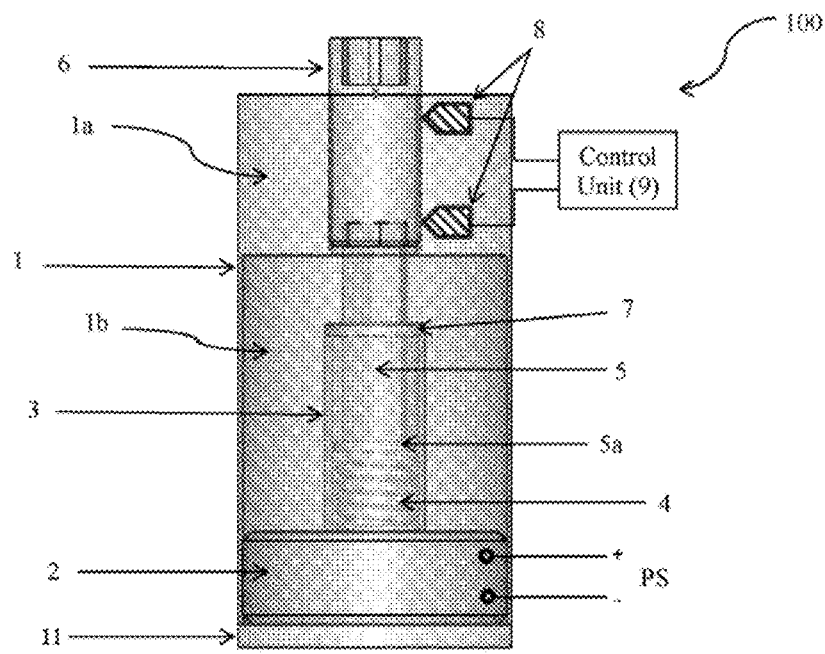
FIG. 4 illustrates an alternate embodiment of the fastener assembly and transparent view of hollow drive shaft of the present disclosure.

FIG. 4 illustrates an alternate embodiment of the fastener assembly (100) having a different fastener (6) in accordance with the present disclosure. The fastener (6) bottom tip end is provided with a hexagonal indentation and the head of the fastener (6) is provided with a hexagonal indentation.

In an embodiment of the present disclosure, the fastener (6) having only the stem but no head can be mounted with a threaded nut (not shown in figure) for additional securement of the fastener (6).

Figure 5A:
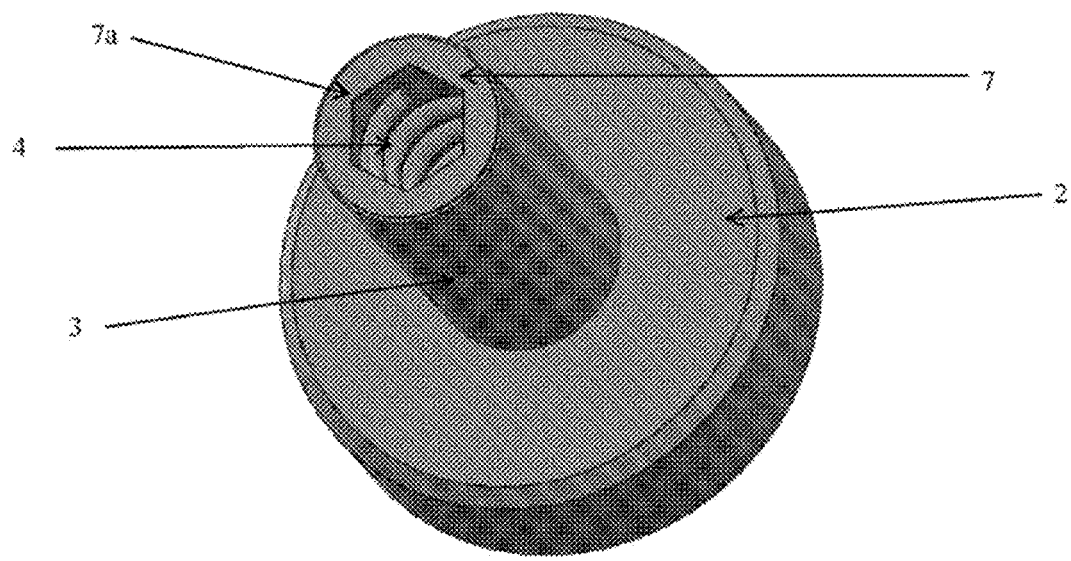
FIG. 5a illustrates perspective view of the drive mechanism without stopper plate in accordance with an embodiment of the present disclosure.
Figure 5B:
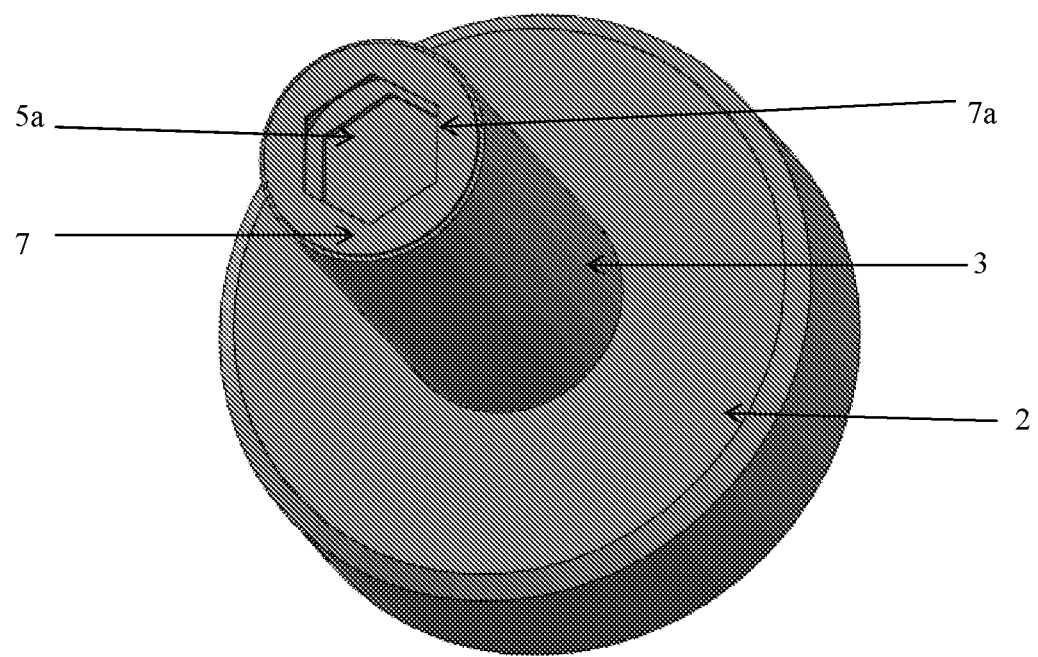
FIG. 5b illustrates perspective view of the drive mechanism with stopper plate in accordance with an embodiment of the present disclosure.

FIGS. 5a and 5b illustrates perspective views of the drive mechanism (2) without stopper plate and with stopper plate in accordance with an embodiment of the present disclosure. The stopper plate (5a) is fixed to the bottom tip end of the torque driver (5) to prevent excess movement of the torque driver (5) within the hollow drive shaft (3).

Industrial Applicability

The device as disclosed in this disclosure finds its potential application in automatic fastening and unfastening of fasteners especially in applications where fasteners are used to fasten one or more components together or in cases where the fasteners have to be fastened or unfastened at regular intervals.

The disclosed fastener assembly (100) finds potential application in quick fastening and unfastening of cargo containers in ships or at docks or in cargo transport vehicles. Since, the containers loaded onto the decks of ships and flatbed vehicles have to be fastened firmly, the fastener assembly (100) disclosed in the above disclosure can be effectively installed at locking points for automatic fastening and unfastening.

Also, the fastener assembly (100) can be used in vehicles especially in cars and mopeds utilized for racing such as track racing off-road racing where there is demand to change the tyres quickly from the drive axle. The fastener assembly (100) disclosed in the present application can cut down on the time required to fasten and unfasten the bolts from the axle of the vehicle and saves time giving an edge over the competitors.

It will be apparent to those skilled in the art that various modifications and variations can be made to the fastener assembly of the present disclosure. Other embodiments of the fastener assembly will be apparent to those skilled in the art from consideration of the specification and practice of the fastener assembly disclosed herein. It is intended that the specification and examples be considered as exemplary only, with a true scope being indicated by the following claims and their equivalents.

Advantages

In one embodiment, the effort required from the user in order to fasten or unfasten the fastener is eliminated, in other words manual labor is eliminated.

In one embodiment, the fastener can be fastened or unfastened without the usage of any mechanical tools.

In one embodiment, the fastener can be operated remotely by the user for quick fastening as described in some of the above applications.

In one embodiment, the fastener assembly saves time and energy consumed in fastening and unfastening of the fastener.

EQUIVALENTS

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

| REFERENCE NUMERALS | |
|---|---|
| 100 | Fastener assembly |
| 1 | Housing member |
| 2 | Drive mechanism |
| 3 | Hollow drive shaft |
| 4 | Resilient member |
| 5 | Torque driver |
| 6 | Fastener |
| 7 | Washer nut |
| 7a | Central hole |
| 8 | Sensor |
| 9 | Control Unit |
| 10 | Through hole |

I claim:

1. An automated fastener assembly, the assembly comprising:
    a housing member configured into a top deck and a bottom hollow deck, wherein the top deck accommodates a fastener;
    a drive mechanism configured within the bottom hollow deck of the housing member, wherein the drive mechanism comprises of:
        a hollow drive shaft fixed to the drive mechanism, the hollow drive shaft comprises a washer nut, secured within a mouth defined at an end of the hollow drive shaft, wherein torque from the drive mechanism is transferred to the washer nut through the hollow drive shaft,
        a resilient member housed within the hollow drive shaft accommodates a torque driver, wherein the torque driver is removably secured within the hollow drive shaft and receives torque from the hollow drive shaft through the washer nut, wherein the torque driver translates within the hollow drive shaft;
    a control unit configured to control the fastening and unfastening of the fastener; and
    at least one sensor installed in the top deck of the housing member and configured to detect the fastener in the top deck of the housing member, the at least one sensor is interfaced with the control unit, which is communicatively coupled with the drive mechanism, wherein the control unit is configured to selectively actuate the drive mechanism and to thereby operate the hollow drive shaft for fastening and unfastening the fastener into and from the housing member of the automated fastening assembly, and wherein the control unit is configured to, upon detecting the fastener at a predetermined position in the top deck of the housing member, initiate driving the hollow drive shaft to fasten the fastener into the housing member of the automated fastening assembly.

2. The assembly as claimed in claim 1, wherein shape of a central hole of the washer nut conforms to the shape of the torque driver.

3. The assembly as claimed in claim 1, wherein the resilient member is a compression spring.

4. The assembly as claimed in claim 1, wherein the resilient member actuates the torque driver linearly within the hollow drive shaft.

5. The assembly as claimed in claim 1, comprising a stopper plate, wherein the stopper plate is provided at tip end of the torque driver to avert non-linear movement of the torque driver within the hollow drive shaft.

6. The assembly as claimed in claim 1, wherein the drive mechanism is operated by an external power source.

7. A method of operating an automated fastener assembly, the method comprising:
- providing an apparatus of claim 1,
- detecting the fastener in the top deck by the least one sensor of the housing member interfaced to the control unit; and
- torquering the hollow drive shaft by the drive mechanism configured in the bottom hollow deck of the housing member,
- wherein the hollow drive shaft transmits torque to the torque driver for fastening and unfastening the fastener.

8. The method as claimed in claim 7, comprising acts of providing positive rotation to the torque driver to unfasten the fastener.

9. The method as claimed in claim 7, comprising acts of providing a negative rotation to the torque driver to fasten the fastener.

* * * * *